F. L. BLOCK.

CORN PLANTER.

No. 11,485. Reissued Apr. 16, 1895.

Attest
John L. Junisow.
M. P. Smith.

Inventor
Francis L. Block.
By Higdon & Higdon & Longan, Attys.

UNITED STATES PATENT OFFICE.

FRANCIS L. BLOCK, OF SIDNEY, ILLINOIS.

CORN-PLANTER.

SPECIFICATION forming part of Reissued Letters Patent No. 11,485, dated April 16, 1895.

Original No. 527,932, dated October 23, 1894. Application for reissue filed December 20, 1894. Serial No. 532,512.

*To all whom it may concern:*

Be it known that I, FRANCIS L. BLOCK, of the city of Sidney, Champaign county, State of Illinois, have invented certain new and useful Improvements in Corn-Planters, of which the following is a full, clear, and exact description, reference being had to the accompanying drawings, forming a part hereof.

The object of my invention is to provide means within the seed box of a corn planter, said means operating directly upon the seed plate and the holes therein, which are for the reception of the grains of corn, thus filling with uniformity each hole in the seed plate before said hole in which the grains of corn are located is carried beneath the cut-off to the discharge.

A further object of my invention is to provide such means, whereby the grains of corn are properly positioned within the holes in the seed plate, so that when said holes containing the grains of corn pass beneath the cut-off, said grains will not be displaced from said holes.

My invention consists in one, or a pair, of spring brushes, or fingers, so positioned as to act directly upon and above the seed plates within the seed box.

My invention further consists in certain novel features of construction, combination, and arrangement of parts, hereinafter specified, pointed out in my claims, and illustrated by the accompanying drawings, in which—

Figure 1:
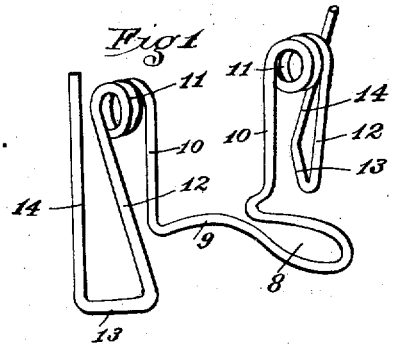
Figure 2:
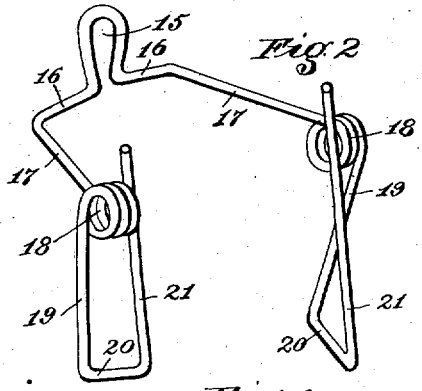
Figure 3:
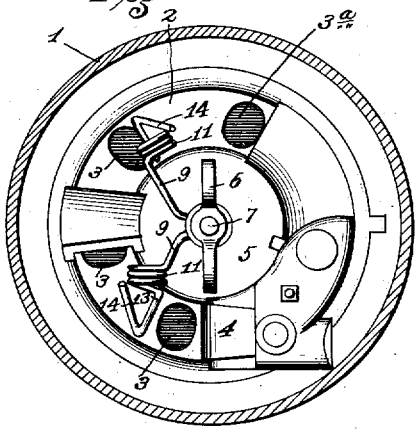
Figure 4:
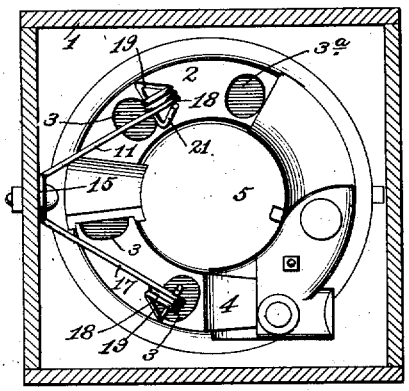
Figure 5:
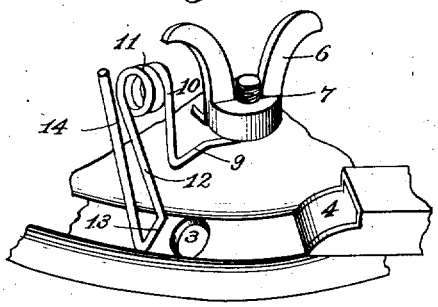
Figure 6:
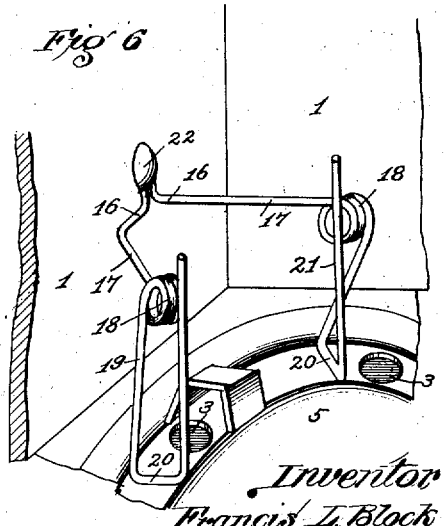

Figure 1 is a perspective view of one form of my improved spring brush. Fig. 2 is a perspective view of a modified form of spring brush. Fig. 3 is a horizontal sectional view of a circular seed box as is in use upon many of the ordinary forms of corn planters, and showing my improved spring brush positioned therein. Fig. 4 is a horizontal sectional view of a seed box such as is in use upon various corn planters, and showing the modified form of my spring brush in position as required for practical use. Fig. 5 is a perspective view of a portion of the seed box such as is seen in Fig. 3, and showing one of the fingers or scrapers of my brush in contact with the seed plate of said seed box. Fig. 6 is a perspective view of a portion of the seed box such as is seen in Fig. 4, and showing the modified form of my improved brush in contact with the seed plate therein.

Referring by numerals to the accompanying drawings, 1 indicates a circular seed box preferably formed of metal, having located in the bottom thereof the seed-plate 2 with its holes or apertures 3, the usual form of cut-off 4, central bearing disk 5, and winged nut 6 in position upon the central bolt 7. The form of seed box shown in Fig. 4 is of that class in which no central bolt, or winged nut, is made use of.

In the construction of my preferred form of brush, a suitable length of resilient wire, preferably steel, has a half loop 8 formed at its center. From thence the ends diverge in nearly opposite directions as indicated by the numeral 9; then bent into a vertical plane 10, and then formed into the coils 11. From these coils the ends of the wire are bent vertically downward, as indicated by the numeral 12, then laterally, said laterally bent portions being designated by the numeral 13; then vertically upward as at 14, and terminate immeately above and adjacent the coils 11. The portions 12, 13 and 14 are so bent and positioned as to lie in a vertical plane a slight distance in the rear of the spring coils 11; also the laterally bent portions 13 lie in a line divergent from the center loop 8. In positioning this form of brush within a seed box, the winged nut 6 is removed from the central bolt 7, the loop 8 then placed around said bolt 7, thus bringing the laterally bent portions 13 into contact with the exposed portions of the seed plate 2. The winged nut now being placed upon the central bolt 7 and firmly screwed down secures in the desired position this form of my brush. It may be here stated that the downwardly pending portions 12, 13 and 14 will be hereinafter spoken of as the scrapers, or fingers.

For use in seed boxes where no central bolt is made use of, I have constructed the modified form of brush as shown in Figs. 2, 4 and 6. In this construction suitable lengths of resilient steel wire have the half loop 15 adapted to lie in a vertical plane formed in their centers. From thence the ends are bent in diverging portions 16; thence into the horizontal diverging portions 17, and then into the coils 18. From these coils 18 the ends extend downwardly as indicated by the numeral 19; thence bent laterally as indicated by 20; thence into the upwardly extending portions 21, which terminate slightly above and adjacent the coils 18. In this modified form the portions 19, 20 and 21 are so bent and positioned as to incline and be slightly in the rear of the coils 18. This form of brush is specially adapted for seed boxes that are constructed of wood or iron and in rectangular form. In securing this form of brush within a seed box, the loop 15 lies against the interior of one of the side walls of the seed box in such a manner as to bring the laterally bent portions 20 of the scrapers or fingers into contact with the exposed portions of the seed plate 2. A suitable bolt or screw 22 passes through the loop 15 and the wall of the seed box, thereby securely positioning the brush in the desired manner.

The practical use of my device is as follows: The parts being in the positions shown and the planter at work, a certain number of grains of corn within the seed box will naturally locate themselves within the holes 3 of the seed plate 2. The hole or aperture $3^a$ in Figs. 3 and 4 being the first hole exposed, as the seed plate revolves in the direction toward the left-hand, a certain number of grains of corn will locate themselves therein. As this hole passes beneath the lateral portion of the scraper or finger, the action of said scraper or finger will be to brush or scrape off any grain, or grains, of corn that might be positioned endwise within said hole. This action is repeated when the holes containing the grains of corn reach the second scraper or finger, which, as contemplated and shown, is directly in front of the cut-off. Thus a uniformity of the number of grains of corn within a hole is obtained as said hole containing the grains of corn passes beneath the cut-off to the discharge.

It has been found that the grains of corn in the holes of seed plates sometimes stand endwise. As said grains pass beneath the cut-off, they will necessarily be displaced from said hole which results in an unequal number of grains in each successive hole being carried to the discharge.

As will be seen by my invention the holes containing the grains of corn are scraped or brushed twice before passing beneath the cut-off. This results in the proper positioning of the grains within the holes and an equal filling of successive holes. Thus will be seen the utility and efficiency of my invention.

What I claim is—

1. In a brush for the seed boxes of corn planters, a single length of wire bent into the form shown and described and having the securing loop of the brush in the same plane with the scraper or finger ends of the brush.

2. A brush, adapted to be located within the seed boxes of corn planters, said brush being bent from a single length of wire in the manner shown and described, the scraping or brushing ends of said brush being divergent and in a lower plane than the securing loop of the brush.

3. A brush for the seed boxes of corn planters, said brush being bent from a single length of wire, spring coils formed in the body of said lengths of wire, and the fingers or scrapers depending from the coiled spring portions of said brush.

4. A brush for the seed boxes of corn planters bent from a single piece of wire, having a securing loop formed in its center, upwardly extending bent portions, coil springs formed in the body of the wire and at the ends of the upwardly bent portions, and depending portions from said coil-springs forming scrapers or fingers, substantially as shown and specified.

5. A brush or scraper, adapted to be secured to the interior of seed boxes of corn planters formed of a single length of wire having a securing loop bent in the center thereof, laterally bent portions diverging from said securing loops, coiled spring portions formed on the ends of said laterally bent portions, and downwardly bent portions forming scrapers or fingers, substantially as shown and specified.

6. The combination, with a movable apertured seed-plate, a nut 6, a central bolt 7, and the usual fixed cut-off for said plate, of a separate spring-brush having an attaching eye or loop 8, and mounted above said plate, the eye or loop engaging said central bolt, substantially as herein shown and specified.

In testimony whereof I affix my signature in presence of two witnesses.

FRANCIS L. BLOCK.

Witnesses:
G. D. BOONE,
AMEL O. BLOCK.